United States Patent Office 2,719,138
Patented Sept. 27, 1955

2,719,138

POLYMERIZATION OF ACRYLONITRILE IN PRESENCE OF N-ACYL ACRYLAMIDE AND N-ACYL METHACRYLAMIDE POLYMERS

Hugh J. Hagemeyer, Jr., and Milton A. Perry, Kingsport, Tenn., assignors to Eastman Kodak Company, Rochester, N. Y., a corporation of New Jersey No Drawing. Application January 17, 1952,
Serial No. 267,016

11 Claims. (Cl. 260—45.5)

This invention relates to resinous, composite polymers comprising acrylonitrile and an N-acyl substituted acrylamide or methacrylamide polymer, and process for preparing these polymers.

Acrylonitrile has previously been used in the preparation of various polymers which are characterized by insolubility, or very low solubility, in many of the usual organic solvents. Many of these polymers, especially those containing a major portion of acrylonitrile, are further characterized by their lack of susceptibility to organic dyes, it being well known that fibers spun from polyacrylonitrile solutions can be passed through dye baths without material amounts of the dye adhering to the fiber.

To increase the dyeability of polyacrylonitrile fibers recourse has been had to interpolymerizing acrylonitrile with certain monomers whose polymers have an affinity for dyes. While this procedure does result in polymers from which dyeable fibers can be obtained, a series drawback arises in certain instances due to a substantial lowering of the softening point of the fiber. For example, while an interpolymer of acrylonitrile and vinyl acetate containing about 80 per cent by weight of acrylonitrile and 20 per cent by weight of vinyl acetate in the polymer molecule, can be drawn into fibers readily susceptible to dyes, the softening point of such fibers is too low for practical purposes, softening of the fibers being observed at about 150°–170° C.

Another method which has been made use of to increase the dyeability of polyacrylonitrile fibers is to mix with the polyacrylonitriles before spinning, other polymeric materials which are dye-susceptible. This procedure likewise provides fibers having good dyeing properties, however, many of these fibers show a low softening point and, in addition, many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate, based on the total weight of the mixed polymerisates, form grainy dopes which separate into layers on standing. This is also true of many other polymeric mixtures and is not surprising because of the nonhomogeneous condition of the spinning solution and the fact that it is generally known that polyacrylonitrile shows poor compatibility with many polymeric materials. Also fibers from such mixtures as above are susceptible to separation by extraction with nonsolvents, or by leaching by chemicals and solutions employed in the processing of the fibers such as in dyeing the fibers, etc. Attempts to produce good fibers from solutions of mixtures of polyacrylonitrile and polymeric amides such as polyacrylamide, methacrylamide and their N-substituted derivatives also have not been very successful because such mixtures also do not give stable, homogeneous solutions, separation into two layers generally occurring in from 24–72 hours. Such solutions or dopes have no technical value because they would separate during storage and processing fibers.

We have now found that certain resinous, composite compositions or polymers comprising acrylonitrile alone or together with a minor proportion of methacrylonitrile, and an N-acyl substituted acrylamide or methacrylamide polymer or copolymer thereof, form stable, homogeneous solutions which do not separate on standing for several days or more, and from which fibers readily susceptible to even, heavy dyeing and showing no segmentation defect can be spun. These fibers are charaterized by their homogeneity, by their susceptibility to organic dyes and by their having softening points above 200° C. Our new polymers assume the character of a unary system, that is, a one component system, since they remain unaffected by solvent extraction techniques and leaching action of processing solutions, as in fiber preparation and treatment, and they cannot be broken down mechanically into their component parts. Furthermore, our new polymers have several advantages not possessed by the simpler compositions prepared by polymerizing acrylonitrile in the presence of polyacrylamide, polymethacrylamide or their N-alkyl substituted polymers. For example, the N-acyl acrylamides and methacrylamides of the invention do not function as chain terminators, whereas the amides of acrylic and methacrylic acids and their N-alkyl substituted derivatives do. Chain termination results in low yields and low average molecular weight. The N-acyl acrylamides and methacrylamides of the invention also have a distinct cost advantage over the N-alkyl substituted amides of acrylic and methacrylic acids, the intermediate monomeric N-acyl compounds of the invention being made with relative ease and good yields directly from either the corresponding nitriles or acetone cyanohydrin by reaction with carboxylic acids containing from 1 to 4 carbon atoms such as acetic, propionic or butyric acids. The monomeric N-acyl amide compounds of the invention can also be prepared by acylating acrylamide or methacrylamide with an isopropenyl ester such as isopropenyl acetate.

It is, accordingly, an object of the invention to provide resinous, composite polymers comprising acrylonitrile and N-acyl substituted acrylamide or methacrylamide polymer. Another object is to provide stable, homogeneous solutions of these resinous composite polymers, and fibers prepared from these solutions. Another object is to provide methods for preparing the same. Other objects will become apparent hereinafter.

In accordance with our invention, we prepare the new polymers or compositions of the invention by heating in the presence of a polymerization catalyst a mixture consisting of from 60 to 95 parts by weight of acrylonitrile and from 40 to 5 parts by weight of an N-acyl substituted acrylamide or methacrylamide polymer prepared from monomers having the general formula:

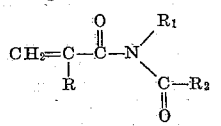

wherein R represents an atom of hydrogen or an alkyl group containing from 1 to 4 carbon atoms (e. g., methyl, ethyl, propyl, isopropyl, butyl, sec. butyl, etc. groups), $R_1$ represents an atom of hydrogen, an alkyl group containing from 1 to 4 carbon atoms and the group

and $R_2$ represents an alkyl group containing from 1 to 3 carbon atoms (e. g., methyl, ethyl, propyl and isopropyl groups). In place of the N-acyl acrylamide or methacrylamide polymers, there can be used an interpolymer containing from 15 to 85 per cent by weight of N-acyl acrylamide or N-acyl methacrylamide or mixtures thereof and from 85 to 15 per cent by weight of acrylonitrile or a minor proportion of another ethenoid compound such as ethylene, methyl acrylate, etc. Suitable N-acyl derivatives of acrylamide and methacrylamide include N-acetyl acrylamide, N-acetyl-N-methyl acrylamide, N-acetyl-N-ethyl acrylamide, N-acetyl-N-butyl acrylamide, N-propionyl acrylamide, N-propionyl N-methyl acrylamide, N-propionyl N-butyl acrylamide, N-butyryl acrylamide, N-butyryl N-methyl acrylamide, etc. and the corresponding N-acyl methacrylamides.

The polymerizations for preparing the new resinous, composite polymers of the invention are accelerated with heat, and temperatures of from 30°–80° C. have been found to be especially useful although higher or lower temperatures can be used, if desired. The polymerizations are further accelerated by employing at least one of the catalysts known to accelerate the polymerization of unsaturates. Typical catalysts include the organic and inorganic peroxides such as hydrogen peroxide, benzoyl peroxide, acetyl peroxide, lauroyl peroxide, etc., persulfates such as ammonium persulfate and alkali-metal persulfates such as sodium, potassium, etc. persulfates, perborates such as sodium potassium etc. perborates and ammonium perborate, percarbonates such as sodium, potassium, etc. carbonates, and the like. Other polymerization catalysts such as organic hydroperoxides, triethyl phosphite, azines, etc. can also be employed to increase the rate of polymerization. The quantity of catalyst used can be varied, however, we have found that from 0.01 per cent to 2.0 per cent by weight, based on the weight of acrylonitrile or mentioned mixtures of acrylonitrile, can be used to advantage. An activating agent such as an alkali metal bisulfite (e. g., sodium or potassium bisulfites, etc.) can be employed, if desired, in conjunction with the polymerization catalyst. The polymerizations can also be carried out advantageously in the presence of a chain regulator such as hexyl, octyl, lauryl, dodecyl mercaptans, etc. The products obtained have been found to contain approximately the same proportions of components as the starting polymerization mixtures.

Although the polymerizations can be carried out either in mass or in the presence of any inert nonsolvent, we have found it especially advantageous to carry out the polymerizations in aqueous dispersions, the particles being small (emulsion) or relatively large (bead or granular). The water-soluble polymerization catalysts such as the mentioned persulfates are especially efficacious in such aqueous dispersion polymerizations. Advantageously, the polymerizations can be carried out in dispersions without the use of emulsifying or dispersing agents. However, if desired, one or more such agents can be used in small amount, not exceeding about 2 per cent, based on the total weight of reactants, including the alkali metal salts of fatty alcohol sulfates (e. g. sodium or potassium lauryl sulfate, etc.), alkali metal salts of aromatic sulfonic acids (e. g. sodium isobutylnaphthaline sulfonate, etc.), sulfosuccinic acid esters, their alkali metal salts or amine addition salts, alkali metal salts of fatty acids containing from 12 to 20 carbon atoms, sulfonated fatty acid amides or their alkali metal salts, the complex reaction products obtained by reacting ethylene oxide with aliphatic alcohols and amines, starch, methylated starch, gum arabic, gelatin, sodium cellulose glycolate, and the like.

The following examples will serve further to illustrate the resinous compositions of the invention, and the manner of their preparation.

*Example 1*

Monomeric N-acetylmethacrylamide was prepared by acetylating methacrylamide with isopropenyl acetate in the presence of sulfuric acid catalyst. 25 g. of this monomer was dissolved in 350 cc. of water containing 0.5 g. of ammonium persulfate and 1.0 g. of sodium bisulfite. After deaeration with nitrogen, the solution was heated to 55° C. for two hours. The water solution of poly N-acetyl methacrylamide was cooled to 30° C. and 75 g. of acrylonitrile was added thereto. A temperature of 50°–55° C. was maintained for two hours by cooling the reaction mixture as required. The polymeric dispersed product was filtered, washed and dried at 70° C. A yield of 97 per cent of calculated was obtained. The product was dissolved to a 16.7 per cent dope in dimethyl formamide from which were spun fibers testing 2.9 g. per denier and 16 per cent elongation. The fibers showed no segmentation defect and had excellent affinity for wool and acetate dyes. The softening point of the fibers was above 210° C.

*Example 2*

25 g. of N-acetyl methacrylamide and 25 g. of acrylonitrile were dissolved in 500 cc. of water containing 0.5 g. of ammonium persulfate, 1.0 g. of sodium bisulfite and 0.25 g. of tertiary dodecyl mercaptan, and the mixture heated at 55°–60° C. for a period of 30 minutes. To the slurry of copolymer obtained, there was added 50 g. of acrylonitrile and the polymerization was completed by heating the mixture at 50°–55° C. for two hours, with cooling as required. The modified acrylonitrile polymer obtained was filtered from the mixture, washed with water and dried at 70° C. A yield of 94 per cent of polymer containing approximately 25 per cent of N-acetyl methacrylamide and 75 per cent of acrylonitrile was obtained. The polymer formed a smooth, clear 15.2 per cent of dope in dimethyl acetamide and was dry spun to give a white lustrous fiber which showed no segmentation defect and tested 3.6 g. per denier and 17.4 per cent elongation.

In place of the N-acetyl methacrylamide, there can be substituted a like amount of other amides including N-acetyl acrylamide, N-acetyl-N-methyl acrylamide, N-acetyl methacrylamide, N, N-diacetylacrylamide, N-acetyl-N-methyl methacrylamide, N-acetyl-N-isopropyl methacrylamide and N, N-diacetyl methacrylamide to give generally similar polymers and fibers.

*Example 3*

32 g. of an ethylene-N-acetyl acrylamide copolymer (monomer ratio 18/82 per cent by weight) was added to 70 g. of acrylonitrile and 500 cc. of water containing 1.0 g. of ammonium persulfate, 1.5 g. of sodium bisulfite and 0.15 g. of tertiary dodecyl mercaptan. The reaction flash was deaerated with nitrogen, and the polymerization temperature held at 51°–56° C., by cooling as required. An 88 per cent yield of polymer, containing approximately 25 per cent by weight of N-acetyl acrylamide, 5 per cent by weight of ethylene and 70 per cent by weight of acrylonitrile, was obtained which was soluble in dimethyl formamide. Dry spun fibers obtained tested 4.5 g. per denier and 12 per cent elongation. They showed no segmentation defect, had good affinity for acid wool dyes and softened above 200° C.

*Example 4*

30 g. of methyl acrylate-N-acetyl methacrylamide copolymer (monomer ratio 33/67 per cent by weight), 70 g. of acrylonitrile and 350 g. of water containing 1.0 g. of ammonium persulfate and 2.0 g. of sodium bisulfite were mixed and the polymerization carried out at 60° C. over a period of 1.5 hours. A yield of 94 g. of polymer containing approximately 20 per cent by weight of N-acetyl methacrylamide, 10 per cent by weight of methyl acrylate and 70 per cent by weight of acrylonitrile, was obtained. It readily formed a 16.7 per cent solution in dimethyl formamide from which fibers were spun showing no segmentation defect and having other good physical properties and excellent affinity for wool and cellulose acetate dyes.

Example 5

30 g. of acrylonitrile-N-acetyl acrylamide copolymer (monomer ratio 80 per cent acrylonitrile and 20 per cent of N-acetyl acrylamide) were added to a reaction flask containing 500 cc. of water with 1.0 g. of ammonium persulfate, 1.5 g. of sodium bisulfite and 0.15 g. of tertiary dodecyl mercaptan. 70 g. of acrylonitrile were then added and the flash deaerated with nitrogen. The aqueous dispersion of polymer and monomer was stirred and heated to 35° C. to initiate the reaction after which a polymerization temperature of 54°–60° C. was maintained by cooling as required. A 92 per cent yield of polymeric product, containing approximately 5.8 per cent by weight of N-acetyl acrylamide and 94.2 per cent by weight of acrylonitrile, was obtained. The product was soluble in dimethyl formamide and in gamma-butyrolactone from which solutions were spun fibers which showed no segmentation defect and tested 5.2 g. per denier and 19 per cent elongation. They had fairly good affinity for acid wool and cellulose acetate dyes and softened above 250° C.

Example 6

40 g. of N-acetyl methacrylamide were dissolved in 500 cc. of water containing 0.5 g. of ammonium persulfate and 1.0 g. of sodium bisulfite. After deaeration with nitrogen, the solution was heated and stirred at 55° C. for 24 hours. The water solution of poly-N-acetyl methacrylamide was cooled to 25° C. and an additional 0.5 g. of ammonium persulfate and 1.0 g. of sodium bisulfite added together with 60 g. of acrylonitrile monomer. An aqueous dispersion was formed by stirring and an exothermic polymerization reaction began almost immediately with the temperature rising from 25°–60° C. in about three minutes, at which point the temperature was held by cooling as required. The dispersed modified acrylonitrile polymeric product obtained was filtered, washed with a 50–50 solution of ethanol and water, and dried at 70° C. An 87 per cent yield of polymer containing approximately 40 per cent by weight of N-acetyl methacrylamide and 60 per cent by weight of acrylonitrile, was obtained. It formed a 17.9 per cent dope in dimethyl formamide which could be both wet and dry spun to give fibers testing 2.4 g. per denier and 12 per cent elongation. The fibers showed no segmentation defect and had excellent affinity for wool and acetate dyes with a high per cent moisture regain.

Example 7

30 g. of N-propionyl methacrylamide and 70 g. of acrylonitrile were dissolved and/or dispersed in 500 cc. of water containing 0.5 g. of ammonium persulfate, 1.0 g. of sodium bisulfite and 0.25 g. of tertiary dodecyl mercaptan. The polymerization was exothermic and complete in 30 minutes at 55°–60° C. The dispersion was diluted with 500 cc. of water containing 0.5 g. of ammonium persulfate, 1.0 g. of sodium bisulfite and an additional 100 g. of acrylonitrile was added to the slurry and a second polymerization in the presence of the N-propionyl methacrylamide-acrylonitrile copolymer was completed in two hours at 50°–55° C., with cooling as required. The modified acrylonitrile polymer obtained was filtered, washed and dried at 70° C. A yield of 97 per cent of polymer containing approximately 15 per cent by weight of N-propionyl methacrylamide, the remainder of the molecule being acrylonitrile, was obtained. The polymer was a fine, white powder which melted above 250° C. without decomposition. It formed a clear, smooth 20 per cent dope in gamma-butyrolactone and on dry spinning gave white, lustrous fibers, which showed no segmentation defect and tested 4.9 g. per denier and 16.9 per cent elongation, and which had good affinity for acid wool and cellulose acetate dyes.

Example 8

20 g. of N-acetyl-N-methyl methacrylamide and 30 g. of acrylonitrile were dissolved in 500 cc. of water containing 0.6 g. of ammonium persulfate, 1.0 g. of sodium bisulfite and 0.12 g. of tertiary dodecyl mercaptan, and the mixture polymerized at 60°–62° C. in 45 minutes to give a copolymer containing the components in the same ratio as the starting polymerization mixture. An additional 0.25 g. of ammonium persulfate was then dissolved in the copolymer slurry, followed by adding 50 g. of acrylonitrile, and the second polymerization completed in 1.5 hours at 55°–60° C., with cooling as required. The resulting N-acetyl-methyl methacrylamide modified acrylonitrile polymer was filtered, washed with aqueous ethanol and dried at 70° C. A 91 per cent yield of a fine, white polymer, containing approximately 20 per cent by weight of N-acetyl-N-methyl methacrylamide and 80 per cent by weight of acrylonitrile, was obtained. The polymer gave a clear, smooth 17.6 per cent dope in gamma-butyrolactone and dry spun to give white, lustrous fiber testing 3.9 g. per denier and 19.2 per cent elongation. The fibers showed no segmentation defect and had excellent affinity for acid wool and acetate dyes, and a softening point about 200° C.

The spinning of fibers from the solutions or dopes of the resinous, composite resins of the invention, as illustrated in the preceding examples, can be carried out by the usual wet spinning methods employing aqueous baths or baths of organic liquids, but preferably the fibers are spun by the dry spinning technique wherein the dope is extruded through a multi-hole spinnerette into a heated atmosphere, the filaments collected on a spool in the cabinet, and the yarn drafted several hundred per cent or more in a heated chamber. Fibers prepared according to the invention dye heavily to dark, even, fast shades with acid wool and cellulose acetate dyes using standard dyeing methods. Although the polymeric products of the invention are particularly useful, as set forth in the examples, for the preparation of fibers and yarns, they can also be used for preparing sheet materials from their mentioned solutions. If desired, fillers, pigments, dyes, plasticizers, etc. can be added to the solutions depending upon the product to be produced.

What we claim is:

1. A process for preparing a resinous, composite acrylonitrile polymer comprising heating in the presence of a peroxide polymerization catalyst a mixture consisting of from 60 to 95 parts by weight of acrylonitrile and from 40 to 5 parts by weight of a polymer of an N-acyl amide having the general formula:

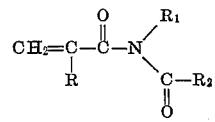

wherein R represents a member selected from the group consisting of an atom of hydrogen and an alkyl group containing from 1 to 4 carbon atoms, $R_1$ represents a member selected from the group consisting of an atom of hydrogen, an alkyl group containing from 1 to 4 carbon atoms and the group

and $R_2$ represents an alkyl group containing from 1 to 3 carbon atoms.

2. A process for preparing a resinous, composite acrylonitrile polymer comprising heating in the presence of a persulfate polymerization catalyst a mixture consisting of from 60 to 95 parts by weight of acrylonitrile and from 40 to 5 parts by weight of a poly-N-acyl amide prepared from a compound having the general formula:

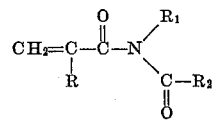

wherein R represents a member selected from the group consisting of an atom of hydrogen and an alkyl group containing from 1 to 4 carbon atoms, $R_1$ represents a member selected from the group consisting of an atom of hydrogen, an alkyl group containing from 1 to 4 carbon atoms and the group

and $R_2$ represents a member selected from the group consisting of an alkyl group containing from 1 to 3 carbon atoms.

3. A process for preparing a resinous, composite acrylonitrile polymer comprising heating in the presence of a persulfate polymerization catalyst a mixture consisting of from 60 to 95 parts by weight of acrylonitrile and from 40 to 5 parts by weight of poly-N-acetyl acrylamide.

4. A process for preparing a resinous, composite acrylonitrile polymer comprising heating in the presence of a persulfate polymerization catalyst a mixture consisting of from 60 to 95 parts by weight of acrylonitrile and from 40 to 5 parts by weight of poly-N-acetyl methacylamide.

5. A process for preparing a resinous, composite acrylonitrile polymer comprising heating in the presence of a persulfate polymerization catalyst a mixture consisting of from 60 to 95 parts by weight of acrylonitrile and from 40 to 5 parts by weight of poly-N-propionyl methacrylamide.

6. A process for preparing a resinous, composite acrylonitrile polymer comprising heating in the presence of a persulfate polymerization catalyst a mixture consisting of from 60 to 95 parts by weight of acrylonitrile and from 40 to 5 parts by weight of poly-N-acetyl-N-methyl methacrylamide.

7. A product obtained according to the process of claim 1.

8. A product obtained according to the process of claim 3.

9. A product obtained according to the process of claim 4.

10. A product obtained according to the process of claim 5.

11. A product obtained according to the process of claim 6.

References Cited in the file of this patent
UNITED STATES PATENTS

| | | |
|---|---|---|
| 2,090,596 | Jacobson | Aug. 17, 1937 |
| 2,620,324 | Coover, Jr., et al. | Dec. 2, 1952 |